US012614847B2

(12) United States Patent
Lee et al.

(10) Patent No.: US 12,614,847 B2
(45) Date of Patent: Apr. 28, 2026

(54) ANTENNA STRUCTURE AND MOBILE DEVICE

(71) Applicant: Wistron NeWeb Corp., Hsinchu (TW)

(72) Inventors: Yueh-Chan Lee, Hsinchu (TW); Cheng-Da Yang, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 36 days.

(21) Appl. No.: 18/827,619

(22) Filed: Sep. 6, 2024

(65) Prior Publication Data

US 2025/0112364 A1 Apr. 3, 2025

(30) Foreign Application Priority Data

Sep. 28, 2023 (TW) ................................ 112137389

(51) Int. Cl.

| | |
|---|---|
| ***H01Q 5/314*** | (2015.01) |
| ***H01Q 1/22*** | (2006.01) |
| ***H01Q 1/48*** | (2006.01) |
| ***H01Q 5/20*** | (2015.01) |
| ***H01Q 9/04*** | (2006.01) |

(52) U.S. Cl.
CPC ........... *H01Q 5/314* (2015.01); *H01Q 1/2266* (2013.01); *H01Q 1/48* (2013.01); *H01Q 5/20* (2015.01); *H01Q 9/0421* (2013.01)

(58) Field of Classification Search
CPC ............... H01Q 1/2266; H01Q 1/2291; H01Q 1/241–243; H01Q 1/38; H01Q 1/48; H01Q 9/04; H01Q 9/42; H01Q 5/378–392
See application file for complete search history.

(56) References Cited

U.S. PATENT DOCUMENTS

| | | | | |
|---|---|---|---|---|
| 10,454,156 B1 | 10/2019 | Yang | | |
| 10,910,698 B2 * | 2/2021 | Wei | ........................ | H01Q 5/357 |
| 11,139,559 B2 * | 10/2021 | Wei | ........................ | H01Q 5/364 |
| 2014/0118204 A1 | 5/2014 | Gavilan | | |
| 2019/0198975 A1 * | 6/2019 | Chen | ........................ | H01Q 9/42 |
| 2023/0198149 A1 * | 6/2023 | Wei | ........................ | H01Q 5/364 343/702 |

FOREIGN PATENT DOCUMENTS

TW 202002403 A 1/2020

* cited by examiner

*Primary Examiner* — Hasan Islam
(74) *Attorney, Agent, or Firm* — McClure, Qualey & Rodack, LLP

(57) ABSTRACT

An antenna structure includes a ground element, a metal cavity, a first radiation element, a second radiation element, a third radiation element, and a capacitive element. The metal cavity includes a first edge segment and a second edge segment which are opposite to each other. The first edge segment is coupled to the ground element. The first radiation element has a feeding point. The first radiation element is adjacent to the second edge segment. The second radiation element is coupled to the first edge segment. The second radiation element is adjacent to the first radiation element. The third radiation element is coupled to the second edge segment. The capacitive element is coupled between the first edge segment and the second edge segment. The first radiation element, the second radiation element, and the third radiation element are disposed between the first edge segment and the second edge segment.

20 Claims, 7 Drawing Sheets

ANTENNA STRUCTURE AND MOBILE DEVICE

CROSS-REFERENCE TO RELATED PATENT APPLICATION

This application claims the benefit of priority to Taiwan Patent Application No. 112137389, filed on Sep. 28, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna structure, in particular to a wideband antenna structure.

BACKGROUND OF THE DISCLOSURE

With the advancement of mobile communication technology, mobile devices have become increasingly common in recent years, including, for example, laptops, mobile phones, multimedia players, and other multifunctional portable electronic devices. To meet people's needs, mobile devices often have wireless communication capabilities. Some cover long-range wireless communication, such as mobile phones using 2G, 3G, Long Term Evolution (LTE) systems, and the frequency bands they use, including 700 MHz, 850 MHz, 900 MHz, 1800 MHz, 1900 MHz, 2100 MHz, 2300 MHz, and 2500 MHz for communication. Some cover short-range wireless communication, such as Wi-Fi and Bluetooth systems using the 2.4 GHZ, 5.2 GHz, and 5.8 GHz frequency bands for communication.

Antennas are indispensable components in the field of wireless communication. If the antenna used to receive or transmit signals has a too narrow operational bandwidth, it can easily lead to a deterioration in the communication quality of the mobile device. Therefore, designing a small-sized, wide-bandwidth antenna structure is an important challenge for designers.

SUMMARY OF THE DISCLOSURE

In an exemplary embodiment, the present disclosure provides an antenna structure including a ground element, a metal cavity, a first radiation element, a second radiation element, a third radiation element, and a capacitive element. The metal cavity includes a first edge segment and a second edge segment opposite to each other. The first edge segment is coupled to the ground element. The first radiation element has a feeding point. The first radiation element is adjacent to the second edge segment. The second radiation element is coupled to the first edge segment. The second radiation element is adjacent to the first radiation element. The third radiation element is coupled to the second edge segment. The capacitive element is coupled between the first edge segment and the second edge segment. The first radiation element, the second radiation element, and the third radiation element are disposed between the first edge segment and the second edge segment.

In some embodiments, the metal cavity substantially has a hollow rectangular body without a cover. The length of the metal cavity is from 37 mm to 45 mm. The height of the metal cavity is from 3 mm to 9 mm.

In some embodiments, the metal cavity has an open side. The first edge segment and the second edge segment are on the same plane near the open side.

In some embodiments, the first edge segment further includes a first protruding portion, and the second edge segment further includes a second protruding portion.

In some embodiments, the capacitive element is coupled to the first protruding portion of the first edge segment and the second protruding portion of the second edge segment.

In some embodiments, the first radiation element is disposed between the second radiation element and the third radiation element.

In some embodiments, the first radiation element substantially has an L-shape, an F-shape, or a T-shape.

In some embodiments, a first coupling gap is formed between the first radiation element and the second edge segment, and the width of the first coupling gap is from 0.2 mm to 0.6 mm.

In some embodiments, the second radiation element substantially has a stripe shape.

In some embodiments, a second coupling gap is formed between the second radiation element and the first radiation element, and the width of the second coupling gap is from 0.2 mm to 0.5 mm.

In some embodiments, the third radiation element substantially has a rectangular shape.

In some embodiments, the capacitive element is a distributed capacitor or a lumped capacitor.

In some embodiments, capacitance value of the capacitive element is from 0.1 pF to 0.6 pF.

In some embodiments, the antenna structure covers a first frequency band, a second frequency band, and a third frequency band.

In some embodiments, the first frequency band is from 2400 MHz to 2500 MHz, the second frequency band is from 5150 MHz to 5850 MHz, and the third frequency band is from 5925 MHz to 7125 MHz.

In some embodiments, the metal cavity, the first radiation element, and the capacitive element are jointly excited to generate the first frequency band.

In some embodiments, the first radiation element is excited to generate the second frequency band.

In some embodiments, the second edge segment, the first radiation element, and the third radiation element are jointly excited to generate the third frequency band.

In some embodiments, the length of the first radiation element is substantially equal to 0.25 times the length of the second frequency band.

In another exemplary embodiment, the present disclosure provides a mobile device including a keyboard frame, a base housing, a hinge element, and an antenna structure as mentioned above. The antenna structure is disposed between the keyboard frame and the base housing. The antenna structure is adjacent to the hinge element.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
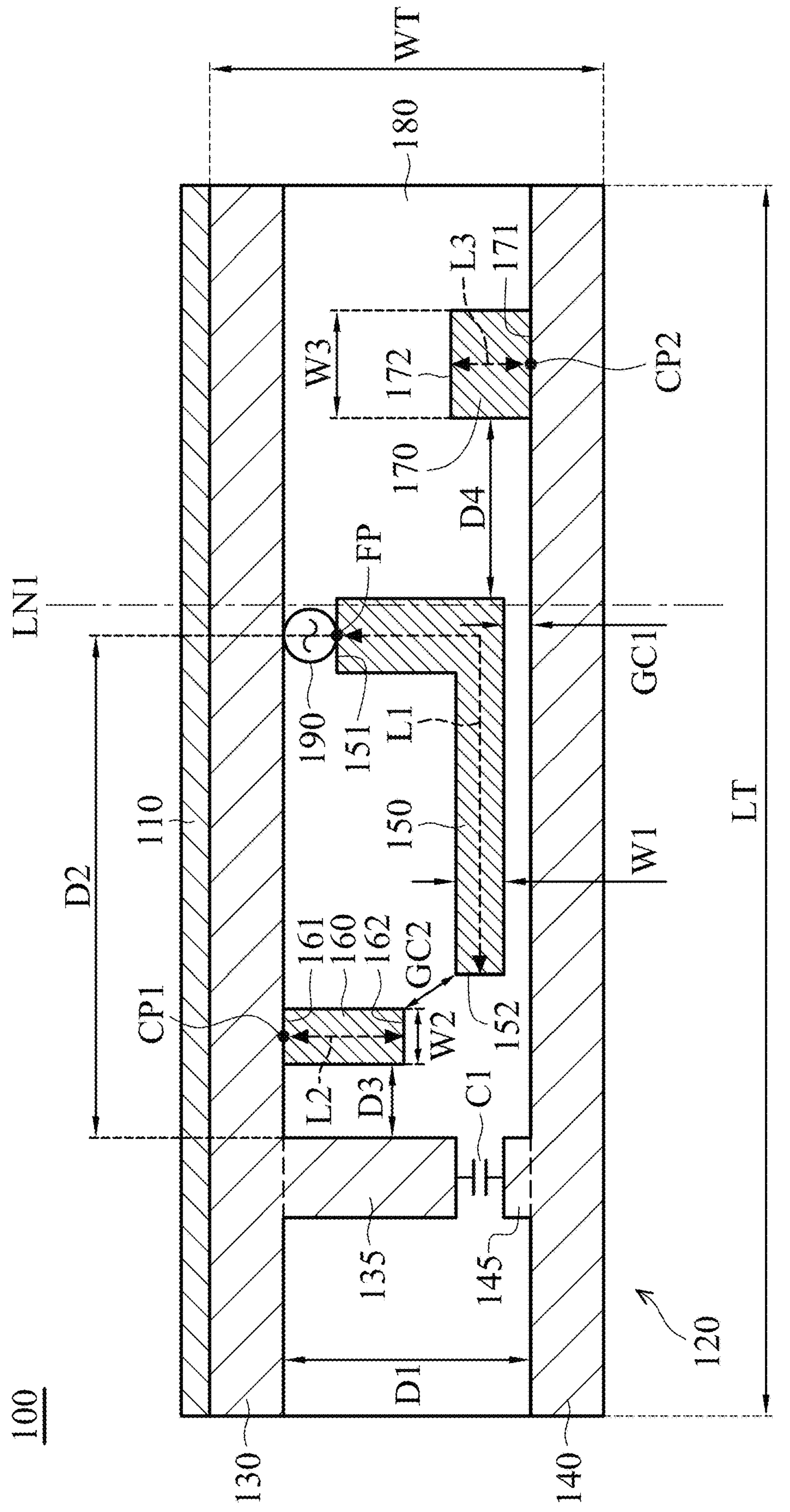
FIG. 1 is a top view of an antenna structure according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

The term "approximate", "substantially" or "roughly" refers to the acceptable range of error within which a person having ordinary skill in the art can address the technical issues and achieve the fundamental technical effect. Furthermore, the term "couple" in the present disclosure includes any direct and indirect means of electrical connection. Therefore, if the disclosure describes a first device coupled to a second device, it means that the first device can be directly electrically connected to the second device or indirectly electrically connected to the second device through other devices or connection means.

Figure 2:
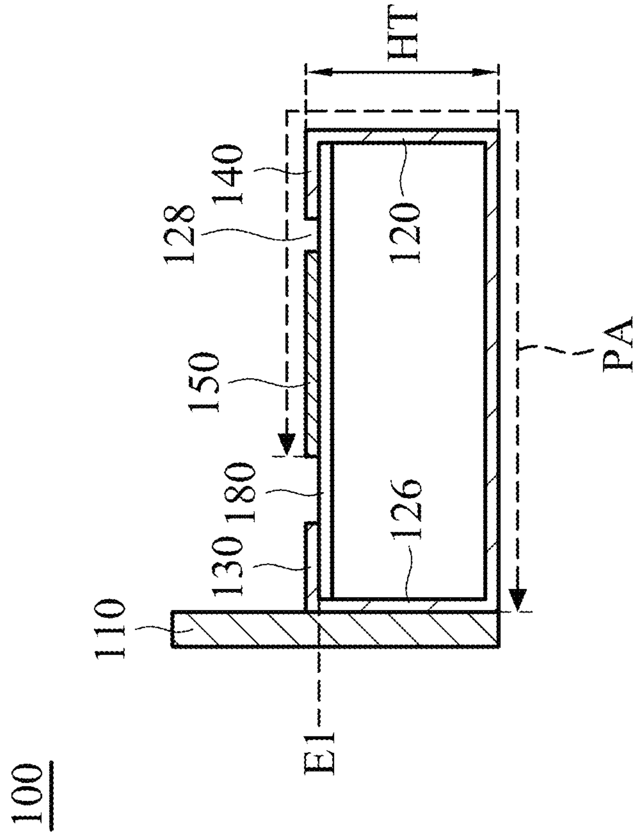
FIG. 2 is a cross-sectional view of an antenna structure according to an embodiment of the present disclosure.

FIG. 1 is a top view of an antenna structure 100 according to an embodiment of the present disclosure. FIG. 2 is a cross-sectional view (along a section line LNI in FIG. 1) of the antenna structure 100 according to an embodiment of the present disclosure. Please refer to FIGS. 1 and 2. The antenna structure 100 can be applied to a mobile device, such as a smart phone, a tablet computer, or a notebook computer. In the embodiment of FIGS. 1 and 2, the antenna structure 100 at least includes a ground element 110, a metal cavity 120, a first radiation element 150, a second radiation element 160, a third radiation element 170, and a capacitive element C1. The ground element 110, the first radiation element 150, the second radiation element 160, and the third radiation element 170 can be made of metal materials, such as copper, silver, aluminum, iron, or alloys thereof.

The ground element 110 can be implemented by a ground copper foil. In some embodiments, the ground element 110 can be further coupled to a system ground plane (not shown in the figure), but is not limited thereto.

The metal cavity 120 includes a first edge segment 130 and a second edge segment 140 opposite to each other. The first edge segment 130 is coupled to the ground element 110. Specifically, the metal cavity 120 can further have a sidewall 126 and an open side 128. The sidewall 126 of the metal cavity 120 and the ground element 110 can be attached to each other. Both the first edge segment 130 and the second edge segment 140 can be located on the same plane E1 of the open side 128 of the metal cavity 120. For example, the plane E1 can be roughly perpendicular to the ground element 110. In some embodiments the metal cavity 120 may substantially have a hollow rectangular body, but is not limited thereto.

In some embodiments, the first edge segment 130 further includes a first protruding portion 135. The second edge segment 140 further includes a second protruding portion 145. The capacitive element C1 is coupled between the first protruding portion 135 of the first edge segment 130 and the second protruding portion 145 of the second edge segment 140. For example, the first protruding portion 135 of the first edge segment 130 may substantially have a longer stripe, and the second protruding portion 145 of the second edge segment 140 may substantially have a shorter stripe, but is not limited thereto.

Generally, the first radiation element 150, the second radiation element 160, and the third radiation element 170 can be disposed between the first edge segment 130 and the second edge segment 140. In addition, the first radiation element 150 can be further located between the second radiation element 160 and the third radiation element 170.

The first radiation element 150 has a first end 151 and a second end 152. A feeding point FP is at a first end 151 of the first radiation element 150. A second end 152 of the first radiation element 150 is an open end. The second end 152 of the first radiation element 150 can be roughly extended in a direction close to the capacitive element C1. The feeding point FP can be coupled to a signal source 190. For example, the signal source 190 can be a radio frequency (RF) module which can be used to excite the antenna structure 100. In some embodiments, the second end 152 of the first radiation element 150 is adjacent to the second edge segment 140. A coupling gap GC1 can be formed between the first radiation element 150 and the second edge segment 140. In some embodiments, the first radiation element 150 can substantially has an L-shape, but is noted limited thereto. It is noted that terms "close" and the "adjacent" in the present disclosure can be directed to a distance (spacing) between two elements which is smaller than a predetermined distance (e.g., 10 mm or less), but it does not include the situation of direct contact (i.e., the distance (spacing) as mentioned shrinks to zero) between the two elements.

The second radiation element 160 has a first end 161 and a second end 162. The first end 161 of the second radiation element 160 is coupled to a first connection point CP1 of the first edge segment 130. The second end 162 of the second radiation element 160 is an open end. In some embodiments, the second end 162 of the second radiation element 160 is adjacent to the second end 152 of the first radiation element 150, so that a second coupling gap GC2 can be formed between the second radiation element 160 and the first radiation element 150. In some embodiments, the second radiation element 160 can substantially have a stripe shape, which can be roughly parallel to the first protruding portion 135 of the first edge segment 130 and the second protruding portion 145 of the second edge segment 140, but is not limited thereto.

The third radiation element 170 has a first end 171 and a second end 172. The first end 171 of the third radiation element 170 is coupled to a second connection point CP2 of the second edge segment 140. The second end 172 of the third radiation element 170 is an open end. For example, the second end 172 of the third radiation element 170 and the second end 162 of the second radiation element 160 can be roughly extended toward opposite directions. In some embodiments, the third radiation element 170 can substantially have a rectangular shape, but is not limited thereto.

For example, the capacitive element C1 can be a distributed capacitor or a lumped capacitor. However, the present disclosure is not limited thereto. In other embodiments, the capacitive element C1 can further be a variable capacitor which is able to provide a tunable capacitance.

In some embodiments, the antenna structure 100 further includes a carrier element 180 in the metal cavity 120. The carrier element 180 can be adjacent to the open side 128 of the metal cavity 120. The first edge segment 130, the second edge segment 140, the first radiation element 150, the second radiation element 160, the third radiation element 170, and the capacitive element C1 can be disposed on the same surface of the carrier element 180. Such surface can be substantially aligned with the plane E1 as mentioned. For example, the carrier element 180 can be a nonconductive support element or a dielectric substrate, but is not limited thereto. It is noted that the carrier element 180 is an optional element. It can be removed in other embodiments.

Figure 3:
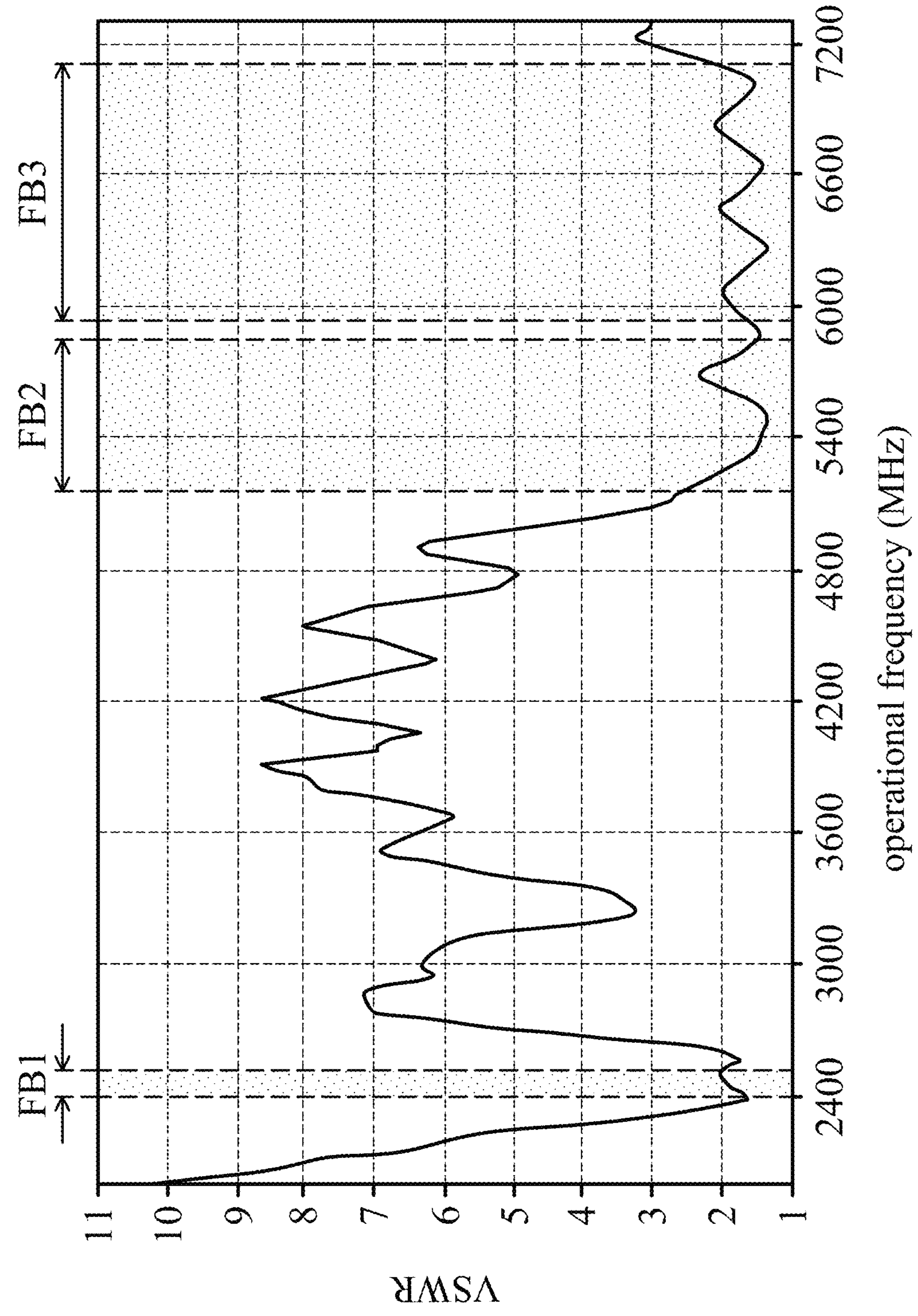
FIG. 3 is a diagram of VSWR (Voltage Standing Wave Ratio) of an antenna structure according to an embodiment of the present disclosure.

FIG. 3 is a diagram of VSWR (Voltage Standing Wave Ratio) of the antenna structure 100 according to an embodiment of the present disclosure. The horizontal axis represents operational frequency (MHz), and the vertical axis represents VSWR. According to measurement results in FIG. 3, the antenna structure 100 can cover a first frequency band FB1, a second frequency band FB2, and a third frequency band FB3. For example, the first frequency band FB1 can be from 2400 MHz to 2500 MHz. The second frequency band FB2 can be from 5150 MHz to 5850 MHz. The third frequency band FB3 can be from 5925 MHz to 7125 MHz. Therefore, the antenna structure 100 can at least support a wideband operation of traditional wireless local area network (WLAN) and new generation Wi-Fi 6E.

In some embodiments, the operation principle of the antenna structure 100 can be described as follows. The metal cavity 120, the first radiation element 150, and the capacitive element C1 can be jointly excited to generate the first frequency band B1 as mentioned. Specifically, the metal cavity 120 can be coupled and excited by the first radiation element 150 to form a current path PA. The current path PA can mainly contribute to the first frequency band FB1. The first radiation element 150 can be further excited to generate the second frequency band FB2 alone. The second radiation element 160 can be used to fine tune the impedance matching of the second frequency band FB2. Furthermore, the second edge segment 140, the first radiation element 150, and the third radiation element 170 can be jointly excited to generate the third frequency band FB3. According to practical measurements, the addition of the capacitive element C1 can also be configured to increase the bandwidth of the first frequency band FB1.

In some embodiments, the element sizes and the element parameters of the antenna structure 100 can be described as follows. A length LT of the metal cavity 120 can be greater than or equal to 40 mm, such as about 50 mm. A width WT of the metal cavity 120 can be from 10 mm to 20 mm, such as about 15 mm. A height HT of the metal cavity 120 can be from 3 mm to 9 mm, such as about 6 mm. A length L1 of the first radiation element 150 can be approximately equal to 0.25 times of the wavelength (λ/4) of the second frequency band FB2 of the antenna structure 100. A width W1 of the first radiation element 150 can be from 1 mm to 3 mm. A length L2 of the second radiation element 160 can be from 2 mm to 5 mm. A width W2 of the second radiation element 160 can be from 1 mm to 2 mm. A length L3 of the third radiation element 170 can be from 3 mm to 5 mm. A width W3 of the third radiation element 170 can be from 2 mm to 4 mm. The capacitance value of the capacitive element C1 can be from 0.1 pF to 0.6 pF. The length of the current path PA can be from 37 mm to 45 mm, which can be approximately equal to 0.25 times the wavelength (λ/4) of the first frequency band FB1 of the antenna structure 100. The width of the first coupling gap GC1 can be from 0.2 mm to 0.6 mm. The width of the second coupling gap GC2 can be from 0.2 mm to 0.5 mm. A distance D1 between the first edge segment 130 and the second edge segment 140 is from 6 mm to 12 mm. A distance D2 between the feeding point FP and a first protruding portion 135 of the first edge segment 130 can be smaller than 0.25 times the wavelength (λ/4) of the first frequency band FB1 of the antenna structure 100. A distance D3 between the second radiation element 160 and the first protruding portion 135 of the first edge segment 130 can be from 3 mm to 6 mm. A distance D4 between the third radiation element 170 and the first radiation element 150 can be from 4 mm to 10 mm. The element sizes and element parameters as mentioned are derived from multiple experimental results, which helps optimize the operational bandwidth and impedance matching. In addition, if more antenna structures 100 are used together, the ranges as mentioned can further maximize the degree of isolation of these antenna structures.

Figure 4:
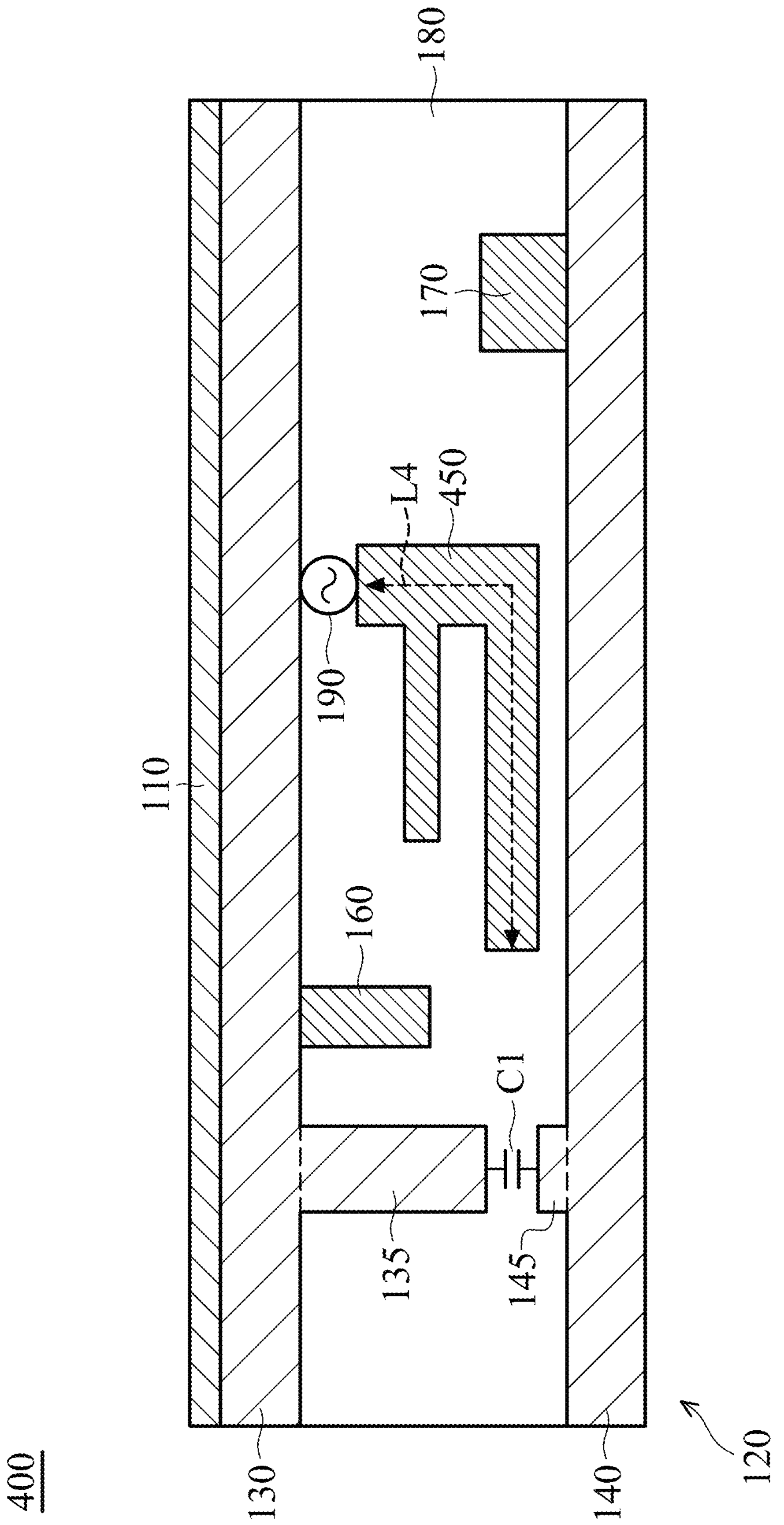
FIG. 4 is a top view of an antenna structure according to an embodiment of the present disclosure.

FIG. 4 is a top view of an antenna structure 400 according to an embodiment of the present disclosure. FIG. 4 is similar to FIG. 1. In the embodiment of FIG. 4, a first radiation element 450 of the antenna structure 400 can be substantially have an F-shape. A partial length L4 of the first radiation element 450 can be approximately equal to 0.25 times the wavelength (λ/4) of the second frequency band FB2 of the antenna structure 400. The remaining characteristics of the antenna structure 400 in FIG. 4 are similar to the antenna structure 100 in FIG. 1, and both these two embodiments can achieve similar operational effects.

Figure 5:
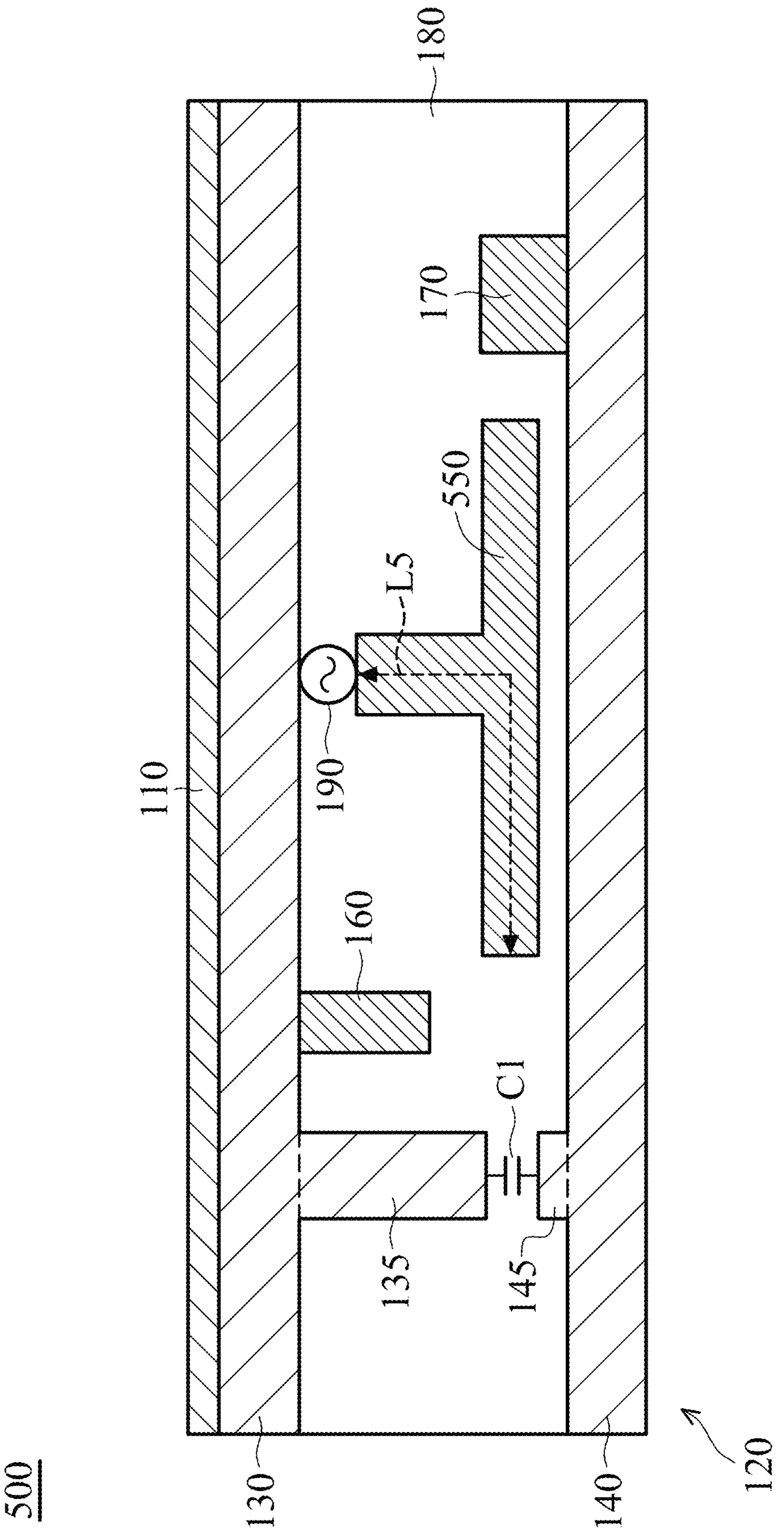
FIG. 5 is a top view of an antenna structure according to an embodiment of the present disclosure.

FIG. 5 is a top view of an antenna structure 500 according to an embodiment of the present disclosure. FIG. 5 is similar to FIG. 1. In the embodiment of FIG. 5, a first radiation element 550 of the antenna structure 500 can be substantially have a T-shape. A partial length L5 of the first radiation element 550 can be approximately equal to 0.25 times the wavelength (λ/4) of the second frequency band FB2 of the antenna structure 500. The remaining characteristics of the antenna structure 500 in FIG. 5 are similar to the antenna structure 100 in FIG. 1, and both the two embodiments can achieve similar operational effects.

Figure 6:
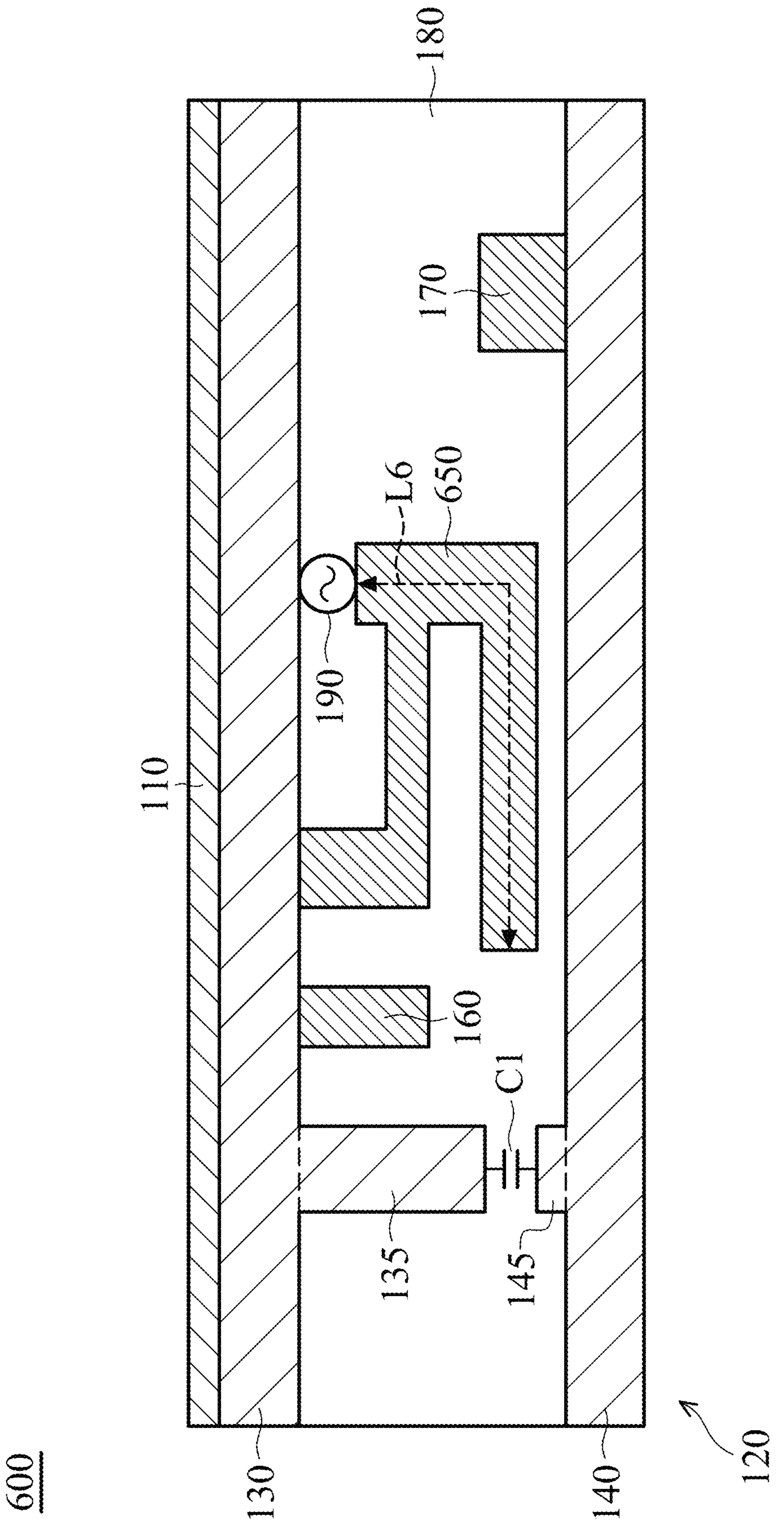
FIG. 6 is a top view of an antenna structure according to an embodiment of the present disclosure.

FIG. 6 is a top view of an antenna structure 600 according to an embodiment of the present disclosure. FIG. 6 is similar to FIG. 1. In the embodiment of FIG. 6, a first radiation element 650 of the antenna structure 600 can be implemented through a planar inverted F antenna (PIFA). A partial length L6 of the first radiation element 650 can also be approximately equal to 0.25 times the wavelength (λ/4) of the second frequency band FB2 of the antenna structure 600. The remaining characteristics of the antenna structure 600 in FIG. 6 are similar to the antenna structure 100 in FIG. 1, and these two embodiments can achieve similar operational effects.

Figure 7:
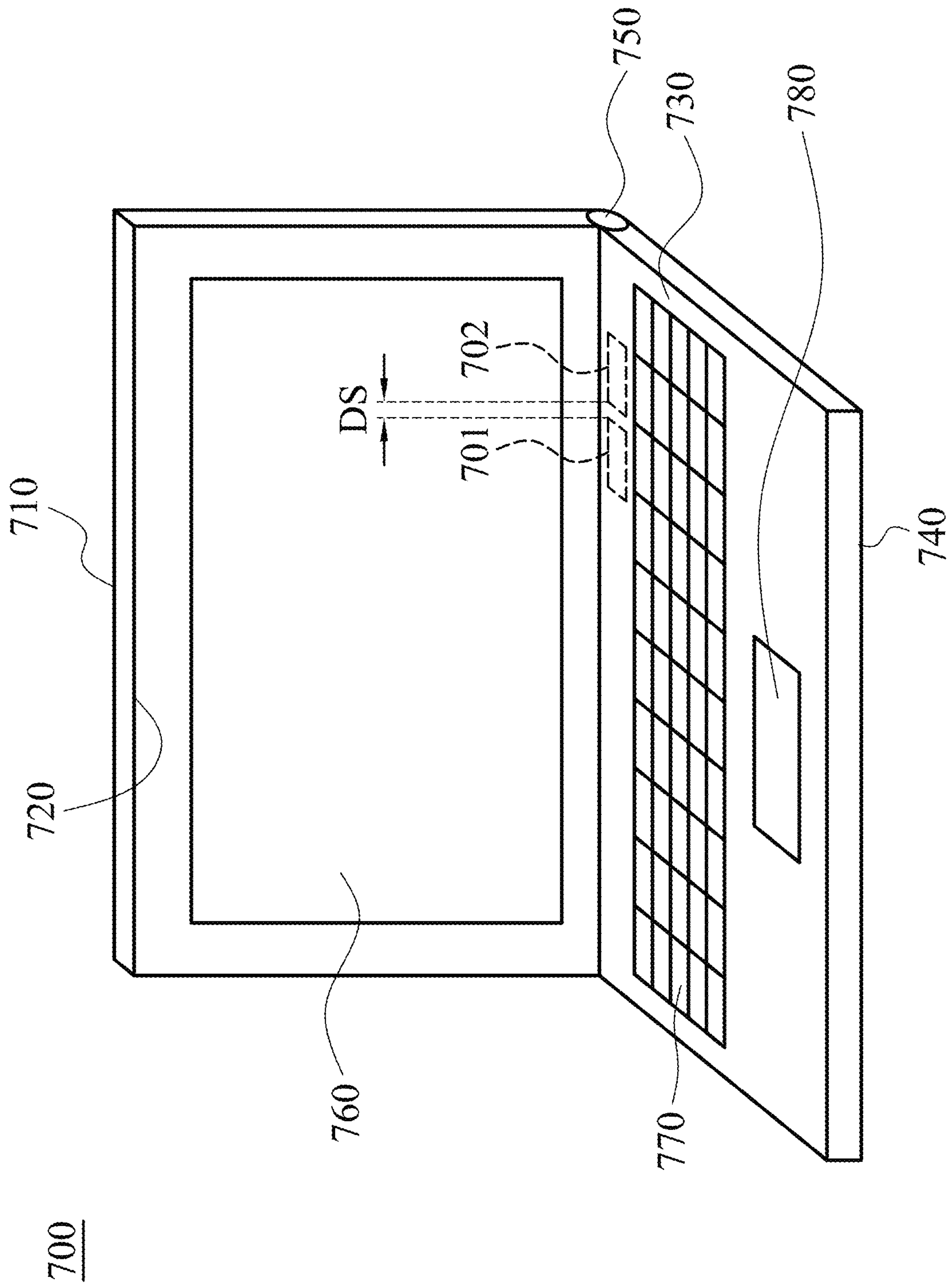
FIG. 7 is a perspective view of a mobile device according to an embodiment of the present disclosure.

FIG. 7 is a perspective view of a mobile device 700 according to an embodiment of the present disclosure. In the embodiment of FIG. 7, the mobile device 700 can include one or more antenna structures 701, 702 as mentioned above. The mobile device 700 can be a notebook computer which may include an upper cover housing 710, a display frame 720, a keyboard frame 730, and a base housing 740. It should be understood that the upper cover housing 710, the display frame 720, the keyboard frame 730, and the base housing 740 are equivalent to so called "A part", "B part", "C part", and "D part" in the field of mobile devices, respectively. In addition, the mobile device 700 can further include a hinge element 750, a display device 760, a keyboard 770, and a click panel 780. The antenna structures 701, 702 can be disposed between the keyboard frame 730 and the base housing 740, and can be adjacent to the hinge element 750 of the mobile device 700. According to practical measurement results, since the noise at the hinge element 750 is usually relatively loud, the use of the metal cavity as mentioned can avoid negative influences on the radiation functions of the antenna structures 701, 702 as mentioned. In addition, if a specified distance DS between the antenna structures 701, 702 as mentioned is smaller than or equal to 8 mm, it is sufficient to strengthen the overall degree of antenna isolation.

The present disclosure provides a novel antenna structure and a corresponding mobile device. Compared to conventional designs, the present disclosure has at least advantages of small size, wide frequency band, high isolation, and operable in different environments, which is suitable for application in various communication devices.

It is worth noting that the element sizes, element shapes, element parameters mentioned above, and the frequency ranges are not limitations of the present disclosure. Antenna designers can adjust these settings according to different requirements. The antenna structure and mobile device of the present disclosure are not limited to the states illustrated in FIGS. 1-7. The present disclosure may include any one or more features of any one or more embodiments in FIGS. 1-7. In other words, not all the features in the figures need to be simultaneously implemented in the antenna structure and mobile device of the present disclosure.

The foregoing description of the disclosure has been presented only for the purposes of illustration and description option of the exemplary embodiments and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure, comprising:

a ground element;

a metal cavity comprising a first edge segment and a second edge segment opposite to each other, wherein the first edge segment is coupled to the ground element;

a first radiation element having a feeding point, wherein the first radiation element is adjacent to the second edge segment;

a second radiation element coupled to the first edge segment, wherein the second radiation element is adjacent to the first radiation element;

a third radiation element coupled to the second edge segment; and a capacitive element coupled between the first edge segment and the second edge segment;

wherein the first radiation element, the second radiation element, and the third radiation element are disposed between the first edge segment and the second edge segment;

wherein the metal cavity has an open side, and the first edge segment and the second edge segment are on the same plane near the open side.

2. The antenna structure according to claim 1, wherein the metal cavity substantially has a hollow rectangular body without a cover, a length of the metal cavity is from 37 mm to 45 mm, and a height of the metal cavity is from 3 mm to 9 mm.

3. The antenna structure according to claim 1, wherein the first edge segment further includes a first protruding portion, and the second edge segment further includes a second protruding portion.

4. The antenna structure according to claim 3, wherein the capacitive element is coupled to the first protruding portion of the first edge segment and the second protruding portion of the second edge segment.

5. The antenna structure according to claim 1, wherein the first radiation element is disposed between the second radiation element and the third radiation element.

6. The antenna structure according to claim 1, wherein the first radiation element substantially has an L-shape, an F-shape, or a T-shape.

7. The antenna structure according to claim 1, wherein a first coupling gap is formed between the first radiation element and the second edge segment, and the width of the first coupling gap is from 0.2 mm to 0.6 mm.

8. The antenna structure according to claim 1, wherein the second radiation element substantially has a stripe shape.

9. The antenna structure according to claim 7, wherein a second coupling gap is formed between the second radiation element and the first radiation element, and the width of the second coupling gap is from 0.2 mm to 0.5 mm.

10. The antenna structure according to claim 1, wherein the third radiation element substantially has a rectangular shape.

11. The antenna structure according to claim 1, wherein the capacitive element is a distributed capacitor or a lumped capacitor.

12. The antenna structure according to claim 1, wherein capacitance value of the capacitive element is from 0.1 pF to 0.6 pF.

13. An antenna structure according to claim 1, wherein the antenna structure covers a first frequency band, a second frequency band, and a third frequency band.

14. The antenna structure according to claim 13, wherein the first frequency band is from 2400 MHz to 2500 MHz, the second frequency band is from 5150 MHz to 5850 MHz, and the third frequency band is from 5925 MHz to 7125 MHz.

15. The antenna structure according to claim 13, wherein the metal cavity, the first radiation element, and the capacitive element are jointly excited to generate the first frequency band.

16. The antenna structure according to claim 13, wherein the first radiation element is excited to generate the second frequency band.

17. The antenna structure according to claim 13, wherein the second edge segment, the first radiation element, and the third radiation element are jointly excited to generate the third frequency band.

18. The antenna structure according to claim 13, wherein the length of the first radiation element is approximately equal to 0.25 times the length of the second frequency band.

19. A mobile device, comprising:

a keyboard frame;

a base housing;

a hinge element; and an antenna structure as claimed in claim 1;

wherein the antenna structure is disposed between the keyboard frame and the base housing;

wherein the antenna structure is adjacent to the hinge element.

20. An antenna structure, comprising:

a ground element;

a metal cavity comprising a first edge segment and a second edge segment opposite to each other, wherein the first edge segment is coupled to the ground element;

a first radiation element having a feeding point, wherein the first radiation element is adjacent to the second edge segment;

a second radiation element coupled to the first edge segment, wherein the second radiation element is adjacent to the first radiation element;

a third radiation element coupled to the second edge segment; and a capacitive element coupled between the first edge segment and the second edge segment;

wherein the first radiation element, the second radiation element, and the third radiation element are disposed between the first edge segment and the second edge segment;

wherein the first edge segment further includes a first protruding portion, and the second edge segment further includes a second protruding portion.

* * * * *